United States Patent [19]

Miyake et al.

[11] Patent Number: 5,107,471
[45] Date of Patent: Apr. 21, 1992

[54] MAGNETIC HEAD HAVING A RECTANGULAR CONFIGURATION FOR USE IN A MAGNETO-OPTICAL RECORDING SYSTEM

[75] Inventors: Tomoyuki Miyake, Nara; Kenji Ohta, Kita-Katsuragi; Hiroyuki Katayama, Nara; Junichiro Nakayama, Shiki, all of Japan

[73] Assignee: Sharp Kabushiki Kaisha, Osaka, Japan

[21] Appl. No.: 594,302

[22] Filed: Oct. 9, 1990

[30] Foreign Application Priority Data

Oct. 11, 1989 [JP] Japan .................. 1-265990

[51] Int. Cl.⁵ .................. G11B 13/04; G11B 11/10
[52] U.S. Cl. .................. 369/13; 360/66; 360/114; 360/103; 360/119
[58] Field of Search .......... 369/13, 14; 360/59, 360/66, 60, 125, 114, 103, 119; 365/122

[56] References Cited

U.S. PATENT DOCUMENTS

| 4,796,241 | 1/1989 | Hayakawa et al. | 369/13 |
| 4,821,126 | 4/1989 | Matsumoto | 360/119 |
| 4,839,761 | 6/1989 | Gatzen | 360/125 |
| 5,010,430 | 4/1991 | Yamada et al. | 360/103 |

FOREIGN PATENT DOCUMENTS

| 52-35616 | 3/1977 | Japan | 360/125 |
| 57-60566 | 4/1982 | Japan | 369/14 |
| 63-78357 | 4/1988 | Japan | 360/114 |
| 1-185854 | 7/1989 | Japan | 369/13 |
| 1-199343 | 8/1989 | Japan . | |

Primary Examiner—Stuart S. Levy
Assistant Examiner—Hoa Nguyen
Attorney, Agent, or Firm—David G. Conlin; Robert F. O'Connell

[57] ABSTRACT

A floating type magnetic head for magneto-optical recording, the magnetic head being positioned opposite to an optical head with a magneto-optical recording medium inserted therebetween. The magnetic head is supported out of contact with the magneto-optical recording medium and includes a slider and a head core. The head core has an end section located parallel to the magneto-optical medium. The end section is formed to be longer in the direction orthogonal to the tracks contained on the medium than in the direction parallel to the tracks.

14 Claims, 4 Drawing Sheets

SLIPPAGE $\alpha_1(\mu m)$ BETWEEN FOCAL POINT OF LASER BEAM AND CENTER OF HEAD CORE SECTION SLIPPAGE $\alpha_2(\mu m)$ BETWEEN FOCAL POINT OF LASER BEAM AND CENTER OF HEAD CORE SECTION

MAGNETIC HEAD HAVING A RECTANGULAR CONFIGURATION FOR USE IN A MAGNETO-OPTICAL RECORDING SYSTEM

BACKGROUND OF THE INVENTION

1. Field of the Invention

The present invention relates to a device for applying a magnetic field on a magneto-optical recording medium which allows information to be recorded, reproduced or deleted on itself, and to a magneto-optical head having the above magnetic head. More particularly, the invention relates to a floating type magnetic head which allows information to be rapidly overwritten on the magneto-optical recording medium in a magnetic field modulation system.

2. Description of the Related Art

A magneto-optical disk often referred to as a magneto-optical recording medium has become well known and used in the field of optical memories, because it has an advantage of rewritability. It has been under study for improving the practical performance of its rewritability operation. Today, it is required to develop a technique of improving the transfer speed of information in order to improve magnetic memories which are currently widely used. For meeting the requirement, current study and development have been focused on an overwriting technique.

A magnetic field modulation system is noted as one of the recording systems which allows an information signal to be rapidly overwritten on a magneto-optical memory. For such magnetic field modulation systems, the most suitable magnetic head for magneto-optical recording is a floating type magnetic head which includes a slider portion and a head core portion and is supported so as to be out of contact with the magneto-optical disk. This floating type magnetic head can quite rapidly invert the magnetic field applied to the magneto-optical recording medium.

As schematically shown in FIG. 1, the normal magneto-optical recording mechanism employing a magnetic field modulation system includes a magnetic head 22 and an optical head 23 integrally configured with each other. The magnetic head 22 is positioned opposite to the optical head 23 so that a magneto-optical disk 21 is inserted therebetween. The disk 21 is one example of a magneto-optical recording medium and rotates about a center axis M. As shown in FIG. 2, the magnetic head 22 is made of a slider 22a and a hook-like square head core 22b extending from one end of the slider 22a. The head core 22b is provided with a coil 22c wound on the outer peripheral surface thereof. As shown in FIG. 3, the bottom section 22d of the head core 22b is located so as to be parallel to the magneto-optical disk 21 and is formed as a square having the dimension of 0.2 mm×0.2 mm, for example.

This description will now be directed to the principle of how an information signal is rapidly overwritten on the disk in the magnetic field modulation system. As shown in FIG. 1, a laser beam 25 is focused through an objective lens 27 located at the optical head 23. The resulting laser beam 25 is continuously radiated on to a recording layer 24 contained on the magneto-optical disk 21 so as to heat the radiated spot on the recording layer 24 to about the Curie temperature at which the magnetic inversion is made possible. Next, while a magnetic field generated by the magnetic head 22 is rapidly inverted to correspond to an information signal, the magnetic head 22 and the optical head 23 integrally configured with each other are allowed to move in the radial direction of the magneto-optical disk 21, that is, in a direction orthogonal of the tracks contained on the disk 21. This results in magnetizing the heated spot of the recording layer 24 in the direction of the applied magnetic field 26, thereby allowing an information signal to be rapidly overwritten on the disk 21.

Each track pitch (not shown) formed on the magneto-optical disk 21 is as small as about 1.6 $\mu$m. However, an actuator (not shown) provided at the optical head 23 allows the objective lens 27 to radially move on the magneto-optical disk 21 for the purpose of adjusting the position G of a focal point of the laser beam 25. With this fine adjustment, a radial recording bit is precisely positioned on the disk 21. The actuator moves the position G of the focal point of the laser beam 25 in the radial direction of the disk 21. The allowable movement is about $\pm 100$ $\mu$m. The movement requires a magnetic field 26 generated by the magnetic head 22 to have such a large and wide magnetic field as to cover the overall moving range of the position G. In actuality, however, the head core 22b of the magnetic head 22 provides a small area 22d located in parallel to the disk 21, which means that it has a very small area 22d over which a vertically effective magnetic field is applied to the disk 21. In order to suppress the self-inductance of the magnetic head 22 to a smaller value, it is necessary to reduce the area of the head core 22b which area is proportional to the self-inductance.

As shown in FIGS. 2 and 3, the area 22d of the head core 22b is formed to give such a narrow magnetic field as disabling for covering the overall moving range of the laser beam 25. Such structure results in mismatching the magnetic field 26 generated by the magnetic head 22 from its correspondence with the position G of the focal point of the laser beam 25 and preventing an information signal from being overwritten on the mismatched portion, thereby producing a disadvantage in using such a structure for that purpose.

SUMMARY OF THE INVENTION

It is, therefore, an object of the present invention to provide a magnetic head for magneto-optical recording which is capable of generating such a strong and wide magnetic field an information signal is allowed to be rapidly and positively over written over the overall moving range of a focal point of a laser beam, when the focal point is moved in the direction orthogonal to the tracks located on the magneto-optical medium by means of an actuator provided in the magnetic head itself.

In carrying out the object in a preferred mode, a floating type magnetic head for magneto-optical recording is located in a position opposite to that of an optical head on opposite sides of a magneto-optical recording medium and supported out of contact with the recording medium. The head includes a slider portion and a head core portion, the head core portion having an end section located in parallel to the recording medium, the end section being formed to be longer in the direction orthogonal to the tracks contained on the recording medium than it is in the direction parallel to the tracks.

As described above, since the end section of the head core portion located parallel to the magneto-optical recording medium is longer in the direction orthogonal to the tracks contained on the medium than in the direction parallel to the tracks, when the actuator provided in the optical head allows the focal position of a laser beam radiated by the optical head to move in the direction orthogonal to the tracks contained in the magneto-optical recording medium, the magnetic head is capable of generating such a large and wide magnetic field that an information signal is allowed to be rapidly and positively overwritten on the recording medium within the overall moving range of the focal point.

For generating such a large and wide magnetic field to allow an information signal to be rapidly and positively overwritten on the overall moving range of the focal point of the laser beam, it is impossible to enlarge the end section of the head core portion. This is because the high-speed magnetic field inversion is carried out by rapidly inverting the current i flowing through the coil in correspondence with an information signal and the self-induction effect serves to induce in the coil an electromotive force e directed to prevent the flow of the current i accordingly. The relation between the electromotive force and the self-inductance can be expressed as follows:

$$e = -L(di/dt)$$

wherein e denotes electromotive force, i denotes the current, L denotes the self-inductance and t denotes time.

As will be understood from the equation, for reducing the induced electromotive force effected to prevent the magnetic field from being rapidly inverted, it is necessary to reduce the self-inductance L. On the other hand, the self-inductance L is proportional to the area of the end section of the coil through which the magnetic flux passes, that is, the section of the head core portion on which the coil is wound and which is located parallel to the magneto-optical recording medium. For reducing the self-inductance, therefore, it is necessary to reduce the area of the end section of the head core portion. This is why the head core portion is not allowed to have a larger section.

According to the invention, however, the magnetic head for magneto-optical recording keeps a normal area of the head core portion. It thus keeps the self-inductance of the magnetic head the same as that of a normal magnetic head, resulting in preventing the magnetic field generated by the magnetic head from being rapidly inverted and allowing an information signal to be rapidly overwritten in the magnetic field modulation system.

Further objects and advantages of the present invention will be apparent from the following description of the preferred embodiment of the invention as illustrated in the accompanying drawings.

DESCRIPTION OF PREFERRED EMBODIMENT

Figure 6:
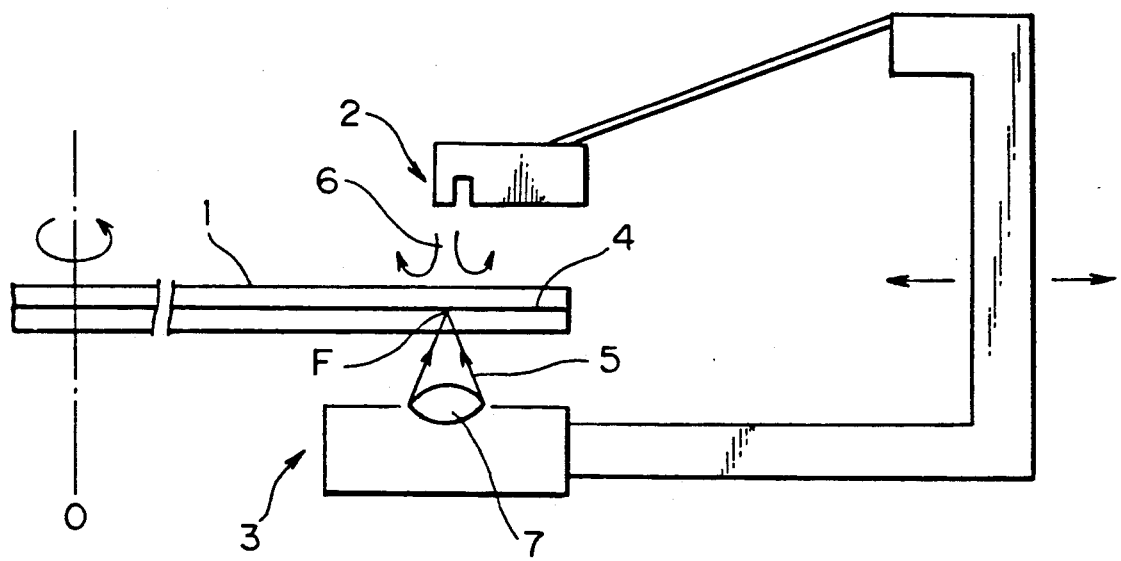
FIG. 6 is a view illustrating how an information signal is rapidly overwritten.

As schematically shown in FIG. 6, a magnetic head 2 for magneto-optical recording is supported to keep a space of about 20 $\mu$m from it to a magneto-optical disk 1 rotating on a center axis O. The magnetic head 2 is integrally formed with an optical head 3 so that the former is positioned opposed to the position of the latter with the magneto-optical disk 1 inserted therebetween.

Figure 7:
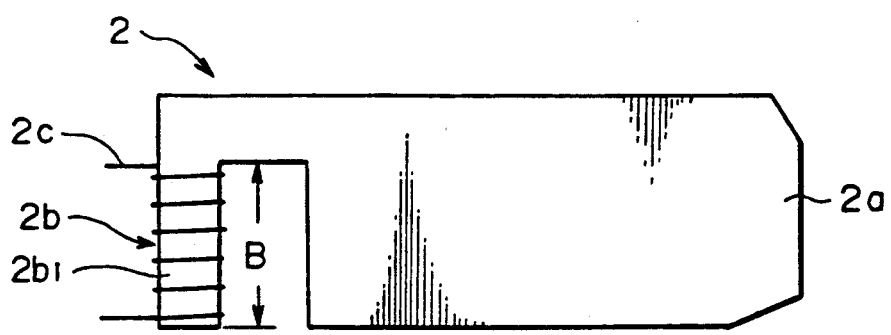
FIG. 7 is a front view showing a magnetic head.

As shown in FIG. 7, the magnetic head 2 is made of a slider 2a and a head core 2b projecting from one end of the slider 2a so as to extend like a hook. Both the slider 2a and the head core 2b are integrally configured using an Mn-Zn ferrite block 8. The head core 2b has a projection 2b1 on which a coil 2c is wound. The length B of the projection 2b1 is 1 mm. The coil 2c consists of twelve Cu windings, each of which has a diameter of 50 $\mu$m. The end section 2d of the head core 2b located parallel to the magneto-optical disk 1 is rectangular so that its longer side is located in the radial direction of the magneto-optical disk 1, that is, in the direction orthogonal to the tracks contained on the magneto-optical disk 1. The sides of the section 2d are 0.4 mm $\times$ 0.1 mm. Hence, the section 2d of the head core 2b has the substantially same area as the end section 22d of the foregoing normal mechanism shown in FIG. 3. So that the magnetic head 2 of the invention provides the same amount of self-inductance as that of the normal recording mechanism. The optical head 3 includes an objective lens 7 for focusing a laser beam 5 and an actuator (not shown) for moving the objective lens 7 vertically and horizontally, that is, in the thickness and radial directions of the magneto-optical disk 1. As shown in FIG. 4, the magneto-optical disk 1 has a surface opposed to the magnetic head 2 on which surface concave and convex tracks 1a are formed with each track pitch A of about 1.6 $\mu$m inserted between two adjacent tracks, as shown in FIG. 4.

The description will now be directed to the principle of how an information signal is rapidly overwritten in the magnetic field modulation system.

The optical head 3 continuously radiates a laser beam 5 to a recording layer 4 of the magneto-optical disk 1 for heating a radiated spot on the recording layer 4 to about the Curie temperature at which magnetic inversion is made possible. The magnetic field 6 generated by the magnetic head 2 is alternately inverted as corresponding to an information signal when it is applied onto the disk 1. While applying the magnetic field in such a state, the magnetic head 2 and the optical head 3 integrally formed with each other are moved in the radial direction of the magneto-optical disk 1. With the movement, the heated spot of the recording layer 4 is magnetized in the direction of the applied magnetic field 6, resulting in allowing an information signal to be rapidly overwritten in the magnetic field modulation system. The magnetic head 2 can generate an air repulsive force between the magneto-optical disk 1 and the magnetic head 2 because it has the slider 2a. The air repulsive force keeps an interval of about 5 to 10 $\mu$m between the magnetic head 2 and the magneto-optical disk 1.

The track pitch of the track 1a formed on the disk 1 is as small as about 1.6 $\mu$m, and the actuator provided in the optical head 3 moves the position F of a focal point of the laser beam 5 in the radial direction of the disk 1 for precisely positioning recording bits on the disk 1 in the radial direction. In actuality, the actuator moves the position F of the focal point of the laser beam 5 about ±100 $\mu$m or more in the radial direction of the disk 1. Hence, the magnetic head 2 is required to positively generate such a strong and wide magnetic field such as to cover the overall range of movement of the focal point position F of the laser beam 5. To meet such requirement, in the head core 2b of the magnetic head 2, the end section 2d located in parallel to the disk 1 has the same area as the end section of the head core included in a normal mechanism, but it is formed to be rectangular so that its longer side is located in the radial direction of the disk 1. Such structure results in providing a magnetic head 2 which is capable of generating such a strong and wide magnetic field 6 so as to cover the overall range of movement of the focal point position F of the laser beam 5 without preventing the magnetic field generated by the magnetic head 2 from being rapidly inverted.

Figure 1:
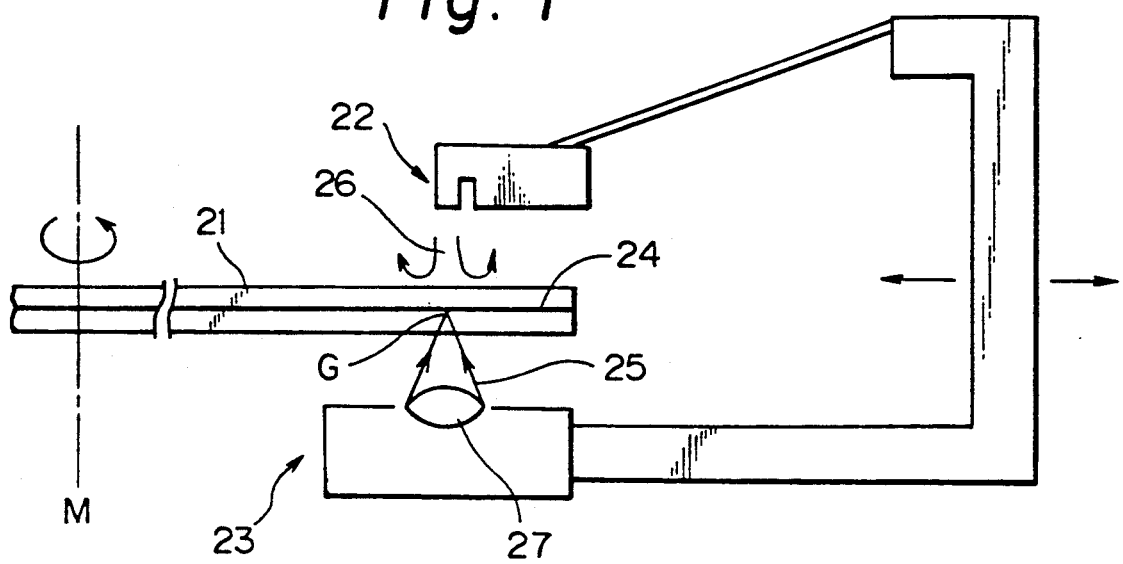
FIG. 1 is a view illustrating the principle of how an information signal is rapidly overwritten on a magneto-optical recording medium according to a normal magneto-optical recording mechanism employing a magnetic field modulation system.
Figure 2:
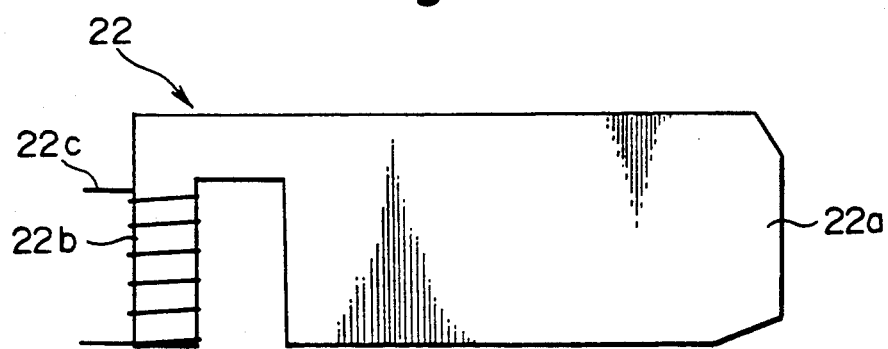
FIG. 2 is a front view showing a magnetic head included in the normal magneto-optical recording mechanism shown in FIG. 1.
Figure 3:
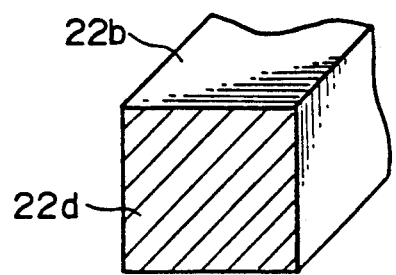
FIG. 3 is a perspective view showing the end section of a head core portion included in the magnetic head shown in FIG. 2.
Figure 4:
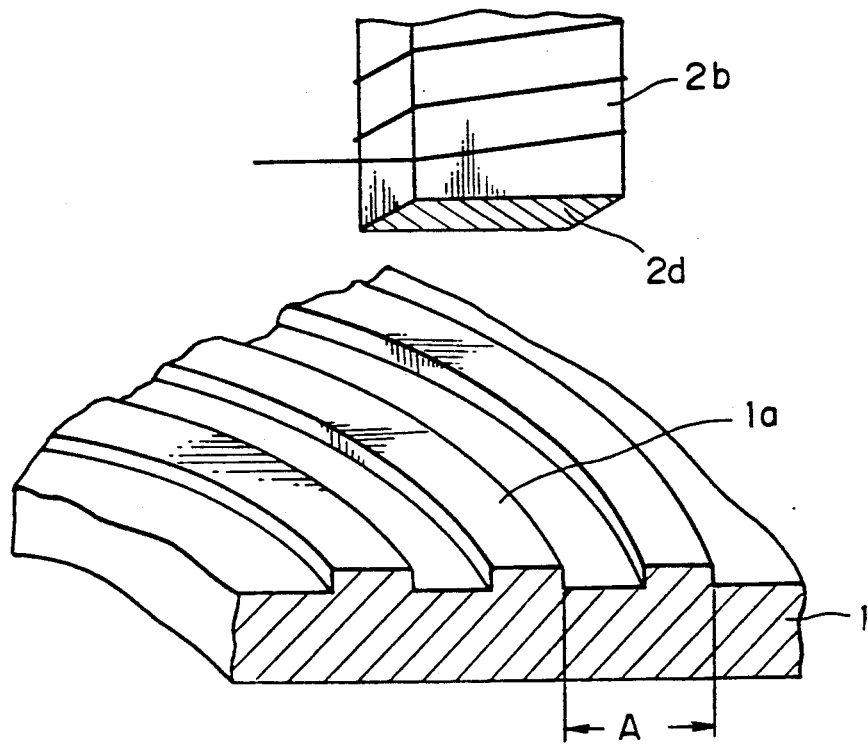
FIG. 4 is a perspective view showing the relation between a head core section located parallel to a magneto-optical disk and tracks contained on the magneto-optical disk.
Figure 5:
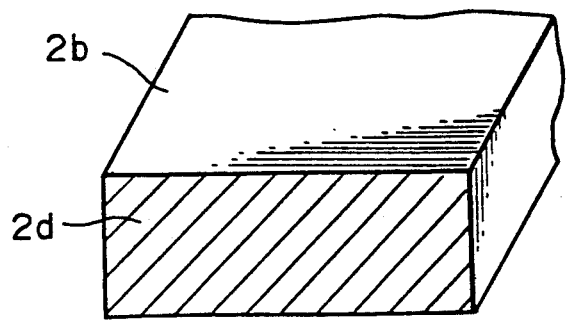
FIG. 5 is a perspective view showing the form of a head core end section in accordance with the invention.

FIGS. 8 to 11 illustrate comparisons of experiments performed using the magnetic head 2 of the invention and the normal magnetic head 22 as shown in FIGS. 1 to 3. The magneto-optical disk 1 used in the experiments contained four layers of Al N/$Dy_{23}Fe_{69}Co_8$/Al N/Al formed on a glass substrate. A protective film was formed to cover them. The thickness of the protecive film was about 10 to 15 $\mu$m.

Figure 8:
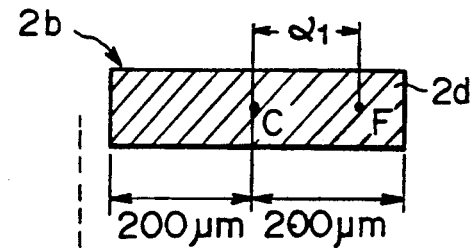
FIG. 8 is a graph showing the relation between a C/N variation of magnetic field modulation recording and a radial slippage of a focal point of a laser beam from the center of a an elongated square head core section of the invention.
Figure 9:
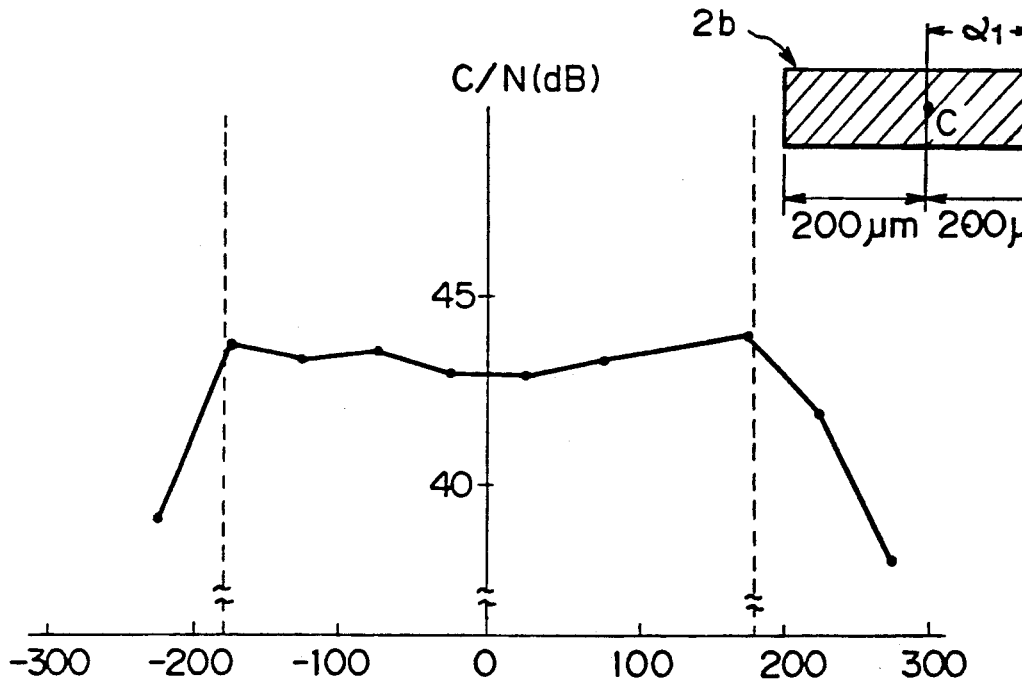
FIG. 9 is a view showing the radial length of the magneto-optical disk between the center of the elongated head core section and the focal point of the laser beam.

FIG. 8 shows the experimental result about the relation between the C/N variation in the magnetic field modulation recording and a radial distance ×1 of the magneto-optical disk 1 between the center C of the rectangular end section 2d of the head core 2b and the focal point position F of the laser beam 5. The rectangular end section 2d of the head core 2b has a dimension of 0.4 mm×0.1 mm as shown in FIG. 9. The experiment was performed on the condition that the number of revolutions of the disk 1 was 3600 rpm, a recording signal had a single frequency, a recording output was 8 mW, a laser beam 5 had a reproducing output of 1.5 mW, the recording range of the track 1a was 30±10 mm from the center of axis O of the disk 1, the current of the coil 2c was ±0.4 A, the current inversion time was 40 ns, the bit length was 0.65 $\mu$m, and the measuring band width used in a spectral analyzer was 30 KHz.

The measured result of FIG. 8 indicates that the use of the magnetic head 2 of the invention keeps a value of C/N substantially constant if the focal point position F of the laser beam 5 stays within the range of ±180 $\mu$m from the center C of the section 2d. Such result means that the magnetic head 2 can enhance signal quality.

Figure 10:
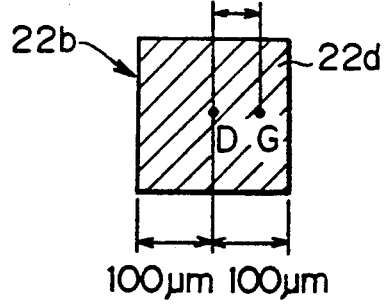
FIG. 10 is a graph showing the relation between a C/N variation of magnetic field modulation recording and a radial slippage of a focal point of a laser beam from the center of a square head core section.
Figure 11:
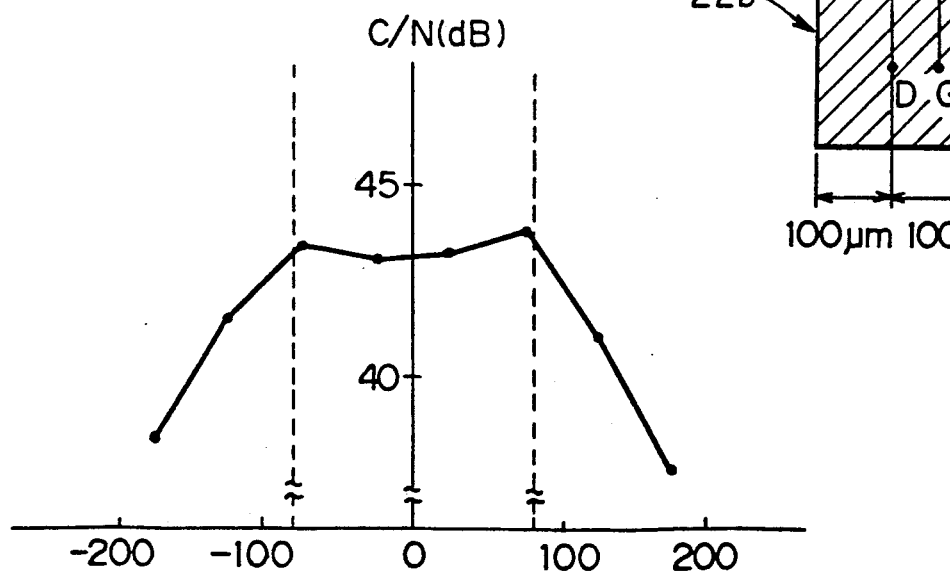
FIG. 11 is a view showing the radial length of the magneto-optical disk between the center of the square head core section and the focal point of the laser beam.

FIG. 10 shows an experimental result concerning the relation between the C/N variation in the magnetic field modulation recording and a radial distance ×2 of the magneto-optical disk 1 between the center C of the square end section 22d of the head core 22b and the focal point position G of the laser beam 5. The square section 22d has a dimension of 0.2 mm×0.2 mm. The experiment was performed under the same conditions as the experiment shown in FIG. 8 except that the section 22d is square. The measured result of FIG. 10 indicates the use of the normal magnetic head 22 provides a value of C/N which is abruptly lower if the focal point position G of the laser beam 25 moves ±80 $\mu$m or more from the center D of the section 22d. Such result means that it degrades the signal quality.

The foregoing experimental results indicate that the magnetic head 2 having a head core 2b whose section 2d is rectangular is capable of generating such a strong and wide magnetic field 6 that an information signal is allowed to be rapidly overwritten on the magneto-optical disk 1 at excellent quality even if the actuator moves the focal point position F of the laser beam 5 by ±100 to 150 $\mu$m from the center C of the end section 2d. The magnetic head 2 of the invention provides two or more times as long an allowable moving range of the focal point position as the normal magnetic head 22. Further, the self-inductance of the magnetic head 2 of the invention is substantially same as that of the normal magnetic head 22. Hence, it is unnecessary to add a new driving circuit (not shown) for performing the rapid magnetic field modulation.

In addition, the section 2d of the magnetic head 2 of the invention is not limited to merely having the form described in the embodiment. The invention can be designed to provide any form of the end section 2d of the head core 2b if it can generate such a strong and wide magnetic field 6 that an information signal is allowed to be rapidly and positively overwritten over the overall range of movement of the focal point position F of the laser beam 5 in the magnetic field modulation system.

Many widely different embodiments of the present invention may be constructed without departing from the spirit and scope of the present invention. It should be understood that the present invention is not limited to the specific embodiment, except as defined in the appended claims.

What is claimed is:

1. A floating type magnetic head for magneto-optical recording of an information signal on a magneto-optical recording medium having tracks contained thereon, said magnetic head being positioned opposite to an optical head for providing a focussed optical beam on said recording medium, said magneto-optical recording medium being positioned between said magnetic head and said optical head, said magnetic head being supported out of contact with said magneto-optical recording medium, said magnetic head comprising:

a slider for permitting movement of said magnetic head; and a head core integrally formed with said slider and having an end section located parallel to said magneto-optical recording medium, said end section being formed to be longer in the direction orthogonal to the tracks contained on said medium than in the direction parallel to the tracks.

2. A floating type magnetic head as claimed in claim 1, wherein the end section of said head core is rectangular.

3. A floating type magnetic head as claimed in claim 2, wherein the rectangular end section of said head core has a dimension of 0.4×0.1 mm.

4. A floating type magnetic head as claimed in claim 1, wherein said magnetic head includes means for providing a self-inductance which is proportional to the area of the end section of said head core and the area of the end section of said head core is selected to provide a predetermined value of the self inductance L.

5. A floating type magnetic head as claimed in claim 1, wherein said optical head includes means for radiating a laser beam focussed on said recording medium, said magnetic head being able to generate such a strong and wide magnetic field that an information signal is allowed to be rapidly and precisely overwritten on said medium within the overall area of movement of the focal point of the laser beam radiated by the optical head.

6. A floating type magnetic head as claimed in claim 1, wherein said magneto-optical recording medium is a magneto-optical disk.

7. A floating type magnetic head as claimed in claim 6, wherein said magnetic head is spatially separated at about 5 to 10 μm from the magneto-optical disk surface.

8. A floating type magneto-optical head system for recording an information signal on a magneto-optical recording medium having tracks contained on said medium, said system having an optical head for providing a focussed beam on said recording medium, and a magnetic head being positioned opposite to said optical head, said magneto-optical recording medium being positioned between said magnetic head and said optical head, said optical head and said magnetic head being supported out of contact with said magneto-optical recording medium, said magnetic head comprising:

a slider for permitting movement of said magnetic head; and a head core integrally formed with said slider and having an end section located parallel to said magneto-optical recording medium, said end section being formed to be longer in the direction orthogonal to the tracks contained on said medium than in the direction parallel to the tracks.

9. A floating type magneto-optical head system as claimed in claim 8, wherein said magnetic head includes means for providing a self-inductance which is proportional to the area of the end section of said head core and the area of the end section of said head core is selected to provide a predetermined value of the inductance L of said head core.

10. A floating type magneto-optical head as claimed in claim 8, wherein the end section of said head core is rectangular.

11. A floating type magneto-optical head as claimed in claim 10, wherein the rectangular end section of said head core has a dimension of 0.4×0.1 mm.

12. A floating type magneto-optical head as claimed in claim 8, wherein said optical head includes means for radiating a laser beam focussed on said recording medium, said magnetic head being able to generate such a strong and wide magnetic field that an information signal is allowed to be rapidly and precisely overwritten on said medium within the overall area of movement of the focal point of the laser beam radiated by the optical head.

13. A floating type magneto-optical head as claimed in claim 8, wherein said magneto-optical recording medium is a magneto-optical disk.

14. A floating type magneto-optical head as claimed in claim 13, wherein said magnetic head is spatially separated at about 5 to 10 μm from the magneto-optical disk surface.

* * * * *